US012669472B2

(12) United States Patent

Mure et al.

(10) Patent No.: US 12,669,472 B2
(45) Date of Patent: Jun. 30, 2026

(54) METHOD FOR DETECTING DEFECTS IN A TUBE HEAT EXCHANGER

(71) Applicant: Electricite de France, Paris (FR)

(72) Inventors: Joseph Mure, Paris (FR); Nicolas Paul, Montreuil (FR); Loïc Vallance, Paris (FR)

(73) Assignee: Electricite de France (FR)

( * ) Notice: Subject to any disclaimer, the term of this patent is extended or adjusted under 35 U.S.C. 154(b) by 108 days.

(21) Appl. No.: 18/384,611

(22) Filed: Oct. 27, 2023

(65) Prior Publication Data

US 2024/0295530 A1      Sep. 5, 2024

(30) Foreign Application Priority Data

Oct. 28, 2022 (FR) ..................................... 2211290

(51) Int. Cl.
*G01N 27/90* (2021.01)
*F28F 27/00* (2006.01)
*G01N 27/9013* (2021.01)

(52) U.S. Cl.
CPC ......... *G01N 27/9046* (2013.01); *F28F 27/00* (2013.01); *G01N 27/902* (2013.01); *F28F 2200/00* (2013.01)

(58) Field of Classification Search
CPC ... G01N 27/9046; G01N 27/902; F28F 27/00; F28F 2200/00
See application file for complete search history.

(56) References Cited

U.S. PATENT DOCUMENTS

| | | | | |
|---|---|---|---|---|
| 10,451,268 | B2 * | 10/2019 | Paul ......................... | F22B 37/00 |
| 11,462,335 | B2 * | 10/2022 | Nishida ..................... | F28D 7/06 |
| 2012/0065927 | A1 * | 3/2012 | Le ......................... | G21C 17/017 |
| | | | | 702/150 |

OTHER PUBLICATIONS

French Preliminary Search Report for Application No. FR 2211290 dated Mar. 29, 2023, 1 page.[See p. 1, categorizing the cited references].

Garcia-Martin, J. et al., "Non-Destructive Techniques Based on Eddy Current Testing", Sensors, MDPI, vol. 11, No. 3, Feb. 28, 2011 (Feb. 28, 2011), pp. 2525-2565, XP002718104.

Steven, V. V. et al., "Pattern Localization in Time Series Through Signal-To-Model Alignment in Latent Space", 2018 IEEE International Conference on Acoustics, Speech and Signal Processing (ICASSP), IEEE, Apr. 15, 2018 (Apr. 15, 2018), pp. 2711-2715, XP033401213.

* cited by examiner

*Primary Examiner* — Reena Aurora
(74) *Attorney, Agent, or Firm* — Lerner David LLP

(57) ABSTRACT

A method for maintaining a tube heat exchanger includes:
   obtaining measurement signals resulting from the passage of a measurement probe in the tubes of the heat exchanger,
   determining a reference time series corresponding to an average, at each instant, of the measurement signals,
   synchronising each measurement signal with the reference time series by applying a dynamic time warping, DTW, to said measurement signal and the reference time series, and
   searching for a potential anomaly by measuring a potential local deviation of a measurement signal with respect to the other measurement signals.

6 Claims, 4 Drawing Sheets

Time

METHOD FOR DETECTING DEFECTS IN A TUBE HEAT EXCHANGER

CROSS-REFERENCE TO RELATED APPLICATIONS

This application claims priority from French application number 2211290, filed Oct. 28, 2022, the disclosure of which is hereby incorporated herein by reference.

TECHNICAL FIELD

The present invention relates in a general way to the field of maintenance of a tube heat exchanger. More precisely, the invention applies to the search for defects in the tubes of the heat exchanger on the basis of signals from a measurement probe passing inside each tube.

TECHNICAL BACKGROUND

A tube heat exchanger such as a steam generator is generally composed of a bundle of tubes in which the hot fluid circulates, and around which the fluid to be heated circulates. For example, in the case of a steam generator of a PWR nuclear power plant, the steam generators are heat exchangers which use the energy from the primary circuit originating from the nuclear reaction, to transform the water of the secondary circuit into steam which will feed the turbine and thus produce electricity.

The steam generator takes a secondary fluid from a liquid state to a vapour state at the saturation limit, using the heat from the primary water. This circulates in the tubes around which the secondary water circulates. The outlet of the steam generator is the point on the secondary circuit with the highest temperature and pressure.

The heat exchange surface, physically separating the two circuits, thus consists of a tube bundle composed of 3500 to 5600 tubes, according to the model, in which the primary water, heated to a high temperature (e.g. 320° C.) and high pressure (e.g. 155 bars), circulates.

In order to ensure the proper operation of the steam generator, it is necessary to periodically inspect the tubes thereof. Since these are not directly accessible to an operator, a measurement probe is used which travels through the inside of the tubes in order to obtain measurement signals, the analysis of which must enable any defects in the tubes to be detected and characterised.

A typical example of a measurement probe is an eddy-current probe, also referred to as an SAX probe. Eddy currents appear in a conductive material when the nearby magnetic flux is varied. Hence, an eddy current probe is circulated in a steam generator tube and used to measure a measurement signal that is a function of the environment in which the probe is located, from which it is possible to extract information regarding anomalies in the tube.

A variation in magnetic induction, typically by a coil in which an AC current flows, generates eddy currents, and the variation of the magnetic field induced thereby is detected. Typically, the voltage different caused by the variation in impedance of the coil is measured.

Once the measurement signals resulting from the passage of a measurement probe in the tubes of the steam generator are obtained, they must then be analysed in order to detect any anomalies therein, which would be representative of the presence of a defect in a tube. This analysis is usually carried out by an operator who reviews the measurement signals. It is an extremely long method, due in particular to the large number of tubes. This approach also has a non-negligible risk of error, since it relies on the experience and skill of a fallible human operator.

Moreover, the simplest approach consists of detecting a local amplitude overshoot, by comparison with a threshold. Although this approach works in areas of a tube where it is not in contact with other elements, it is ineffective when other elements are located in the vicinity of the tubes. In addition, the tubes can have variations in geometry which can make interpretation of the amplitude variations difficult.

FIG. 1 shows an example of a measurement probe 1 travelling through a tube 2 of a steam generator in order to acquire a measurement signal. The tubes 2 of the steam generator are held by spacer plates 4 generally disposed perpendicular to the tubes which pass through them. In order to allow the water which vaporises to pass, the passages 6 of tubes 2 of these spacer plates 4 are foliated, in other words their shape has lobes around the tubes 2. As the water changes from the liquid state to the vapour state, it deposits all the matter that it contains. If the matter deposits take place in the lobes, they reduce the free cross-section of the passage 6: this is clogging, which is therefore the progressive blocking, by the deposits, of the holes or passages 6 intended for the passage of the water/steam mixture.

A tube 2 of a steam generator generally comprises a straight portion 2a of the hot branch, where the hot heat transfer fluid arrives in the tube, followed by a curved part 2b, referred to as the bend, and finally a straight portion 2c of the cold branch, where the cooled heat transfer fluid exits. There are also anti-vibration bars 8 on the curved part 2b.

Hence, the presence of the spacer plates 4, anti-vibration bars 8 or a clogging deposit in the passages 6 of the spacer plates 4 influences the measurement signal, and a potential defect cannot be detected simply by searching for an amplitude variation of the measurement signal. One solution is to compare the measurement signal in a particular area with the reference signal corresponding to the measurement signal in this area in the absence of a defect. For example, in the case of the passing of a spacer plate 4, the measurement signal can be compared with a previously acquired reference signal which corresponds to the passing of a spacer plate 4 for a tube 2 without defect.

FIG. 2 thus shows an example of amplitude variations of a component of a measurement signal acquired by an eddy-current probe 1 along a tube 2 of a steam generator, as a function of time and therefore of the trajectory of the probe 1 along the tube 2. A first part 10a corresponds to the straight portion 2a of the hot branch, where the hot heat transfer fluid arrives in the tube. The presence of sudden amplitude variations is noted, linked to the crossings of the upper edge of the tubular plate, the flow distribution plate and then (from the third) the spacer plates 4, at approximately regular intervals. Then comes the second part 10b corresponding to the curved portion 2b of the tube. Here, sudden amplitude variations appear again, but this time linked to crossing of the anti-vibration plates 8 by the measurement probe 1. Compared to the first part 10a, the period of the sudden amplitude variations is shorter and less regular. Finally, a third part 10c corresponds to a straight portion 2c of the cold branch, where the cooled heat transfer fluid exits. Here there are sudden amplitude variations linked to crossing the spacer plates 4, then the flow distribution plate and the upper edge of the tubular plate encountered in the first part 10a.

Theoretically, the reaction of the measurement probe 1 to the passing of a known element can be anticipated, and it would then be possible to use the corresponding reference signal. However, the reference signal cannot be representative of the environment of the measurement probe 1, and therefore cannot enable the defects to be detected. As mentioned above, it happens that, for example, a passage 6 of a tube 2 of a spacer plate 4 is clogged, with a deposit of unknown size and constitution, which makes the comparison with a reference signal ineffective for detecting a defect of the tube 2. Moreover, the movement of the measurement probe 1 in the tube 2 can exhibit local speed variations, in particular in the curved area of the tube since the measurement probe 1 can no longer move in a straight line. The position of external elements such as the anti-vibration bars 8 can also not be known with precision. This can result in a desynchronisation of the measurement signals, even though it is necessary to know the correspondence well between the measurement signal and the position of the measurement probe 1 in order to be able to use a potential reference signal at the right place in the measurement signal.

Consequently, there is a need for a method for detecting defects in the tubes of a heat exchanger which makes it possible to automatically identify the tubes potentially containing a defect.

DESCRIPTION OF THE INVENTION

Proposed is a method for maintaining a tube heat exchanger, comprising:

obtaining measurement signals resulting from the passage of a measurement probe in the tubes of the heat exchanger, determining a reference time series corresponding to an average, at each instant, of the measurement signals, synchronising each measurement signal with the reference time series by applying a dynamic time warping, DTW, to said measurement signal and the reference time series, searching for a potential anomaly by measuring a potential local deviation of a measurement signal with respect to the other measurement signals synchronised with the reference time series.

Using the proposed method, it is possible to automatically identify the tubes potentially containing a defect. This makes it possible to exclude a large majority of the signals to be analysed, which clearly correspond to healthy areas of tube. The operators can thus concentrate uniquely on the various areas where the signal has abnormal features. Hence, the proposed method advantageously enables the analysis time to be substantially reduced and reduces the risk of diagnostic error.

This method is advantageously supplemented by the following features, taken individually or in any of the technically possible combinations thereof:

each measurement signal is a multidimensional time series comprising P components, P is a natural integer greater than or equal to 2, and the reference time series comprises P components;

the DTW is applied multidimensionally on the P components simultaneously;

the search for a potential anomaly is carried out component by component;

the method comprises selecting, among the measurement signals, measurement signals resulting from the passage of a measurement probe in tubes belonging to a subset of tubes grouped according to the similarity of their physical properties;

the search for a potential anomaly by measuring a potential local deviation of a measurement signal with respect to the other measurement signals comprises determining a distance between a value of the measurement signal and the corresponding values of other measurement signals;

a median filter is applied to the distances determined during the search for anomalies;

the measurement probe is a multifrequency eddy current probe.

The invention also concerns a computer program product, comprising program code instructions for executing the method steps according to the invention when said program is executed on a computer. The computer program product can take the form of a non-transitory medium on which the instructions are stored, especially a hard drive, an SSD, a flash memory, etc.

DESCRIPTION OF THE FIGURES

Other features, aims and advantages of the invention will emerge from the following description, which is given purely by way of illustration and not being limiting and which should be read with reference to the attached drawings, in which.

DETAILED DESCRIPTION

Figure 1:
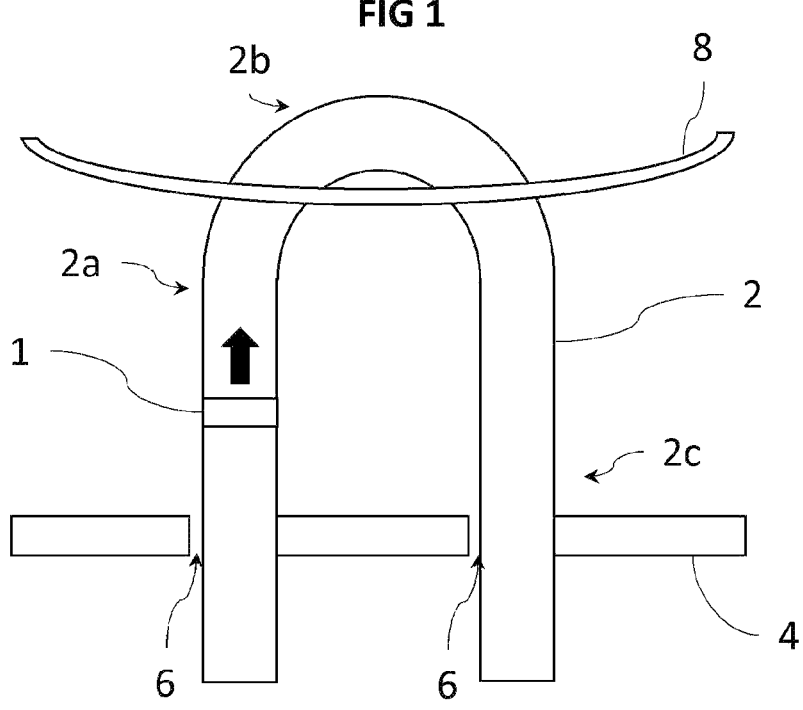
FIG. 1 schematically shows an example of a measurement probe travelling through a tube of a steam generator in order to acquire measurement signals.
Figure 3:
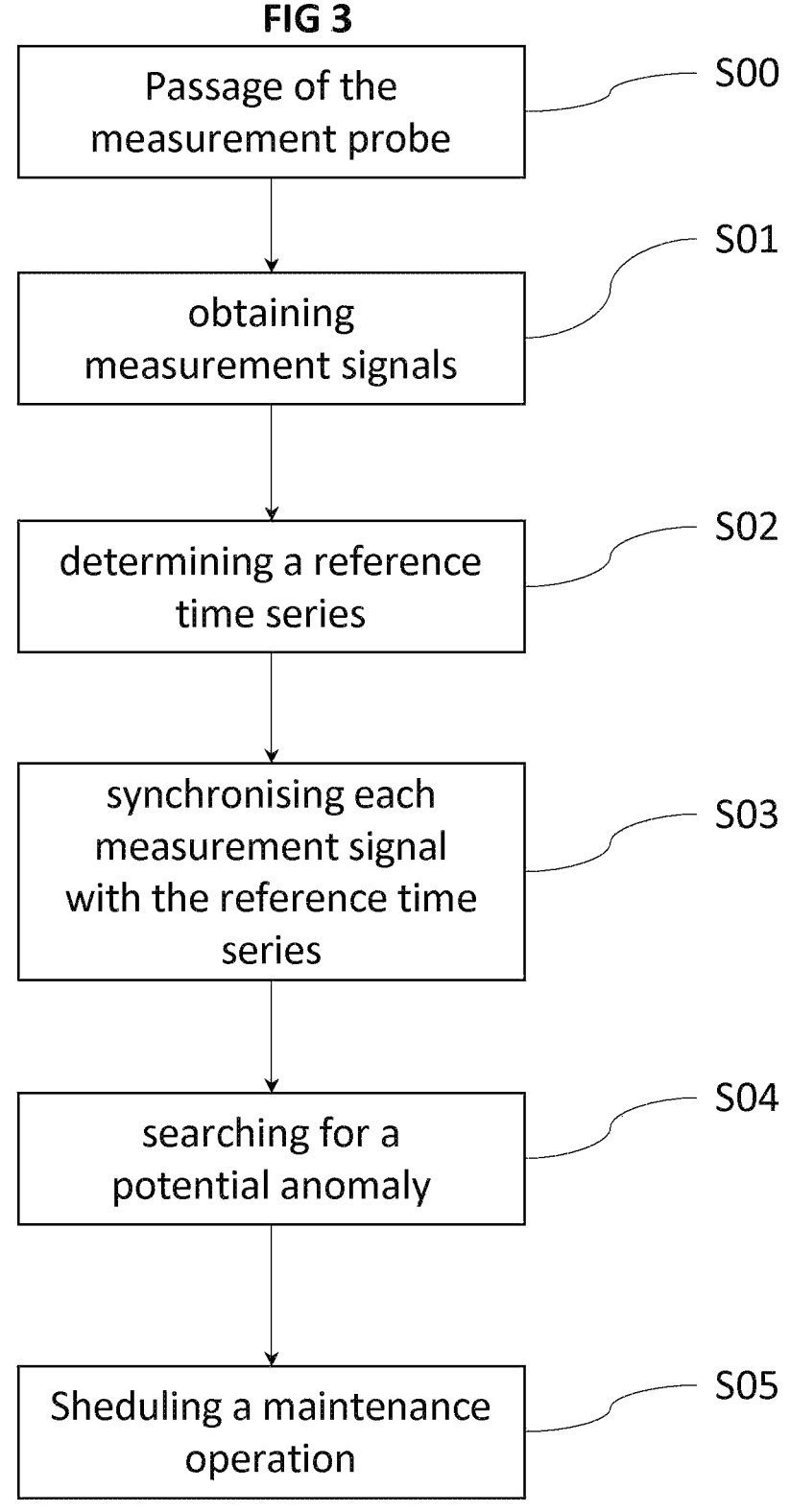
FIG. 3 is a diagram showing steps to be implemented of the method according to a possible embodiment of the invention.

With reference to FIG. 1 and FIG. 3, a maintenance method will be described comprising the detection of a potential anomaly of a measurement signal which could be caused by a defect in the tube 2 of the heat exchanger. A defect is typically a crack in the wall of the tube 2, but can also be another change in the structure of the tube 2 which is able to cause the measurement signal to vary locally.

A first step (S01) consists of obtaining measurement signals resulting from the passage of a measurement probe 1 in the tubes 2 of the heat exchanger. The measurement signals can be of diverse nature, since the measurement signals can have variations linked to the presence of a defect in a tube 2. For example, the measurement signals can be electrical responses to stimulations such as the generation of eddy currents, as mentioned above, or can result from ultrasound acquisition by means of an ultrasound probe, or can even result from the detection of radio waves. The measurement signals are preferably multidimensional, comprising a plurality of components each corresponding to one acquisition channel of the measurement probe 1. Each measurement signal is preferably a multidimensional time series comprising P components, P being a natural integer greater than or equal to 2, and preferably greater than or equal to 4.

It is thus possible to envisage a preliminary step (step S00) of passage of the measurement probe 1 into the tubes 2 in order to acquire the measurement signals which are then collected, but the measurement signals can be obtained otherwise, and it is possible, in particular, to obtain measurement signals stored on a data medium, for example from past acquisitions.

Figure 2:
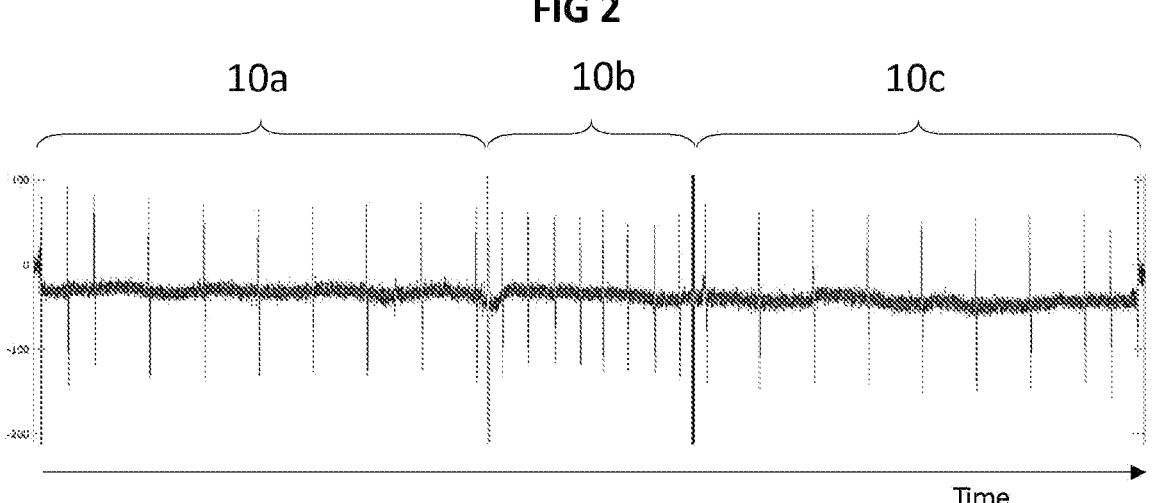
FIG. 2 shows an example of graphic representation of a component of a measurement signal acquired by an eddy-current probe along a tube of a steam generator.

By way of example, and in a preferred embodiment used for the remainder of the description, the measurement signals come from a multifrequency eddy-current probe. A measurement signal then has the form of a complex impedance, with real and imaginary components at several frequencies coming from as many acquisition channels. For example, it is possible to have four frequencies resulting in a measurement signal with eight components. The frequencies are, for example, between 100 kHz and 600 kHz. FIG. 2 shows an example of amplitude variations of a component of a measurement signal acquired by an eddy-current probe along a tube 2 of a steam generator, as a function of time and therefore of the trajectory of the measurement probe 1 along the tube 2.

Due to the large number of tubes 2 present in a heat exchanger, a large number of measurement signals can thus be obtained. Typically, there are at least several hundred measurement signals. However, as these are acquired independently of one another, and as the speed of movement of the measurement probe 1 can vary depending on the tubes 2, the measurement signals are not synchronised with one another. For example, the passing of a given spacer plate will be present at different instants in two measurement signals. It is also possible that the tubes 2 have variable lengths. It is therefore useful to synchronise the measurement signals, by making the main amplitude variations encountered correspond over all the measurement signals.

It is possible to carry out a recalibration of the time series of the measurement signals beforehand, aiming to ensure that they all have the same number of times steps. Such a recalibration is known to a person skilled in the art and implies, for example, an interpolation or an addition of intercalated values (typically zeros) followed by low pass filtering.

After recalibration, the measurement signals appear as Q time series $x_1, x_2, \ldots, x_Q$ of size N, in other words for any integer i between 1 and Q, the time series $x_i$ is a function $\{1, \ldots, N\} \to \mathbb{R}^P$, with P being the number of components of the measurement signal.

A reference time series is then determined (step S02). This reference time series comprises the arithmetic mean, at each instant, of the measurement signals: i.e. $\bar{x}: \{1, \ldots, N\} \to \mathbb{R}^P$ the reference time series defines, for any element $t \in \{1, \ldots, N\}$, by:

$$\bar{x}(t) = \frac{1}{Q} \sum_{i=1}^{Q} x_i(t).$$

There is then a synchronisation (step S03) of each measurement signal with the reference time series by applying a dynamic time warping, or DTW, to said measurement signal and the reference time series, For any $i \in \{1, \ldots, Q\}$, the DTW provides a synchronisation function $f_i:\{1, \ldots,$ $N\} \to \{1, \ldots, N\}$ which minimises, under certain constraints ($f_i$ must namely be increasing), the sum of the following differences:

$$\sum_{t=1}^{N} \|x_i \circ f_i(t) - \bar{x}(t)\|$$

where the double bars designate the Euclidean norm.

It should be noted that since each measurement signal is synchronised with the reference time series, by transitivity, the measurement signals become synchronised with one another. In addition, since the reference series is constructed from the set of measurement signals, the synchronisation does not therefore rely on the arbitrary designation of one of the measurement signals as being the reference or by the choice of an external signal.

Usually, the DTW implements a distance calculation between series, which requires applying the DTW to each pair of series, i.e. Q(Q−1)/2 calculations of DTW when Q series are processed. By determining and using the reference series, the number of calculations of DTW is reduced to Q, the DTW being applied to each series relatively to the reference series. However, the use of the DTW is very computation intensive, and therefore time and resource intensive. This reduction in the computing time makes it possible to group together a large number of series and to improve the quality of the detection. Indeed, the number of measurement signals taking into account is preferably greater than 100, more preferably greater than 500, and still more preferably greater than 1000.

As mentioned above, the measurement signals resulting from the acquisition by eddy-current measurement probes 1 are multidimensional values. More precisely, the existence of four channels with complex values means that there are values in $\mathbb{C}^4$. The complex values are separated into real and imaginary parts in order to obtain a measurement signal with values in $\mathbb{R}^8$. In the following, each of the 8 values composing the measurement signal are denoted XFA, YFA, XF1, YF1, XF2, YF2, XF3 or YF3, the XF values being derived from real parts while the YF values are derived from imaginary parts, the last letter A designates an acquisition in absolute mode while the presence of a figure indicates an acquisition in differential mode. Of course, this is only a limited example and the measurement signal can be different, and the number P of components can be different from 8. Preferably, however, P is strictly greater than 3.

The DTW is preferably applied multidimensionally on the P components simultaneously with the measurement signal: the DTW is applied to the vectors in $\mathbb{R}^P$ grouping together the components of the measurement signal. A measurement signal with values in $\mathbb{R}^P$ will undergo the time warping, minimising the sum of the Euclidean distances between its points (in $\mathbb{R}^P$) and the corresponding points of the reference series. In order to be chosen, a warping must therefore be advantageous in all the components of the measurement signal and not just one. Due to the fact that the external elements such as the spacer plates 4 are visible on all the components of a measurement signal, applying the DTW to the measurement signals at values in $\mathbb{R}^P$ rather than separating each component, makes it possible to stabilise and avoid synchronisation errors (such as, for example, the synchronisation of an aberrant peak in a component with a spacer plate edge 4 visible on the reference signal).

Figure 4:
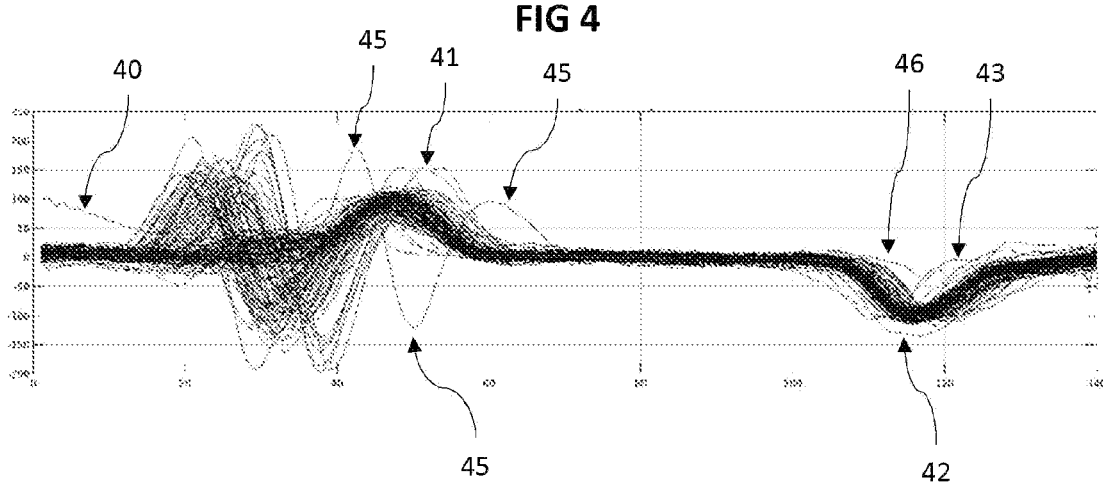
FIG. 4 shows an example of an extract of a first component of a measurement signal corresponding to the passing of a spacer plate by the measurement probe, without synchronisation.
Figure 5:
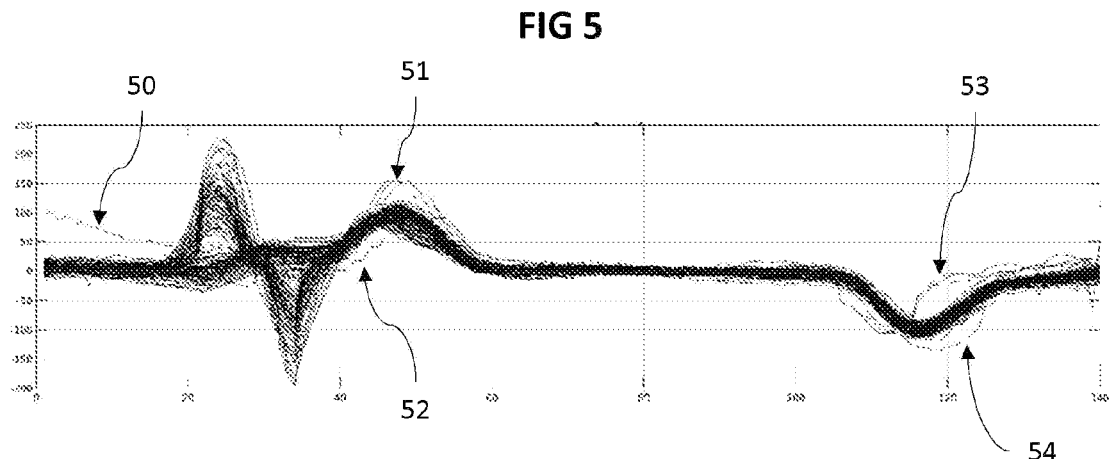
FIG. 5 shows the example of FIG. 4 after synchronisation by DTW with the reference time series.
Figure 6:
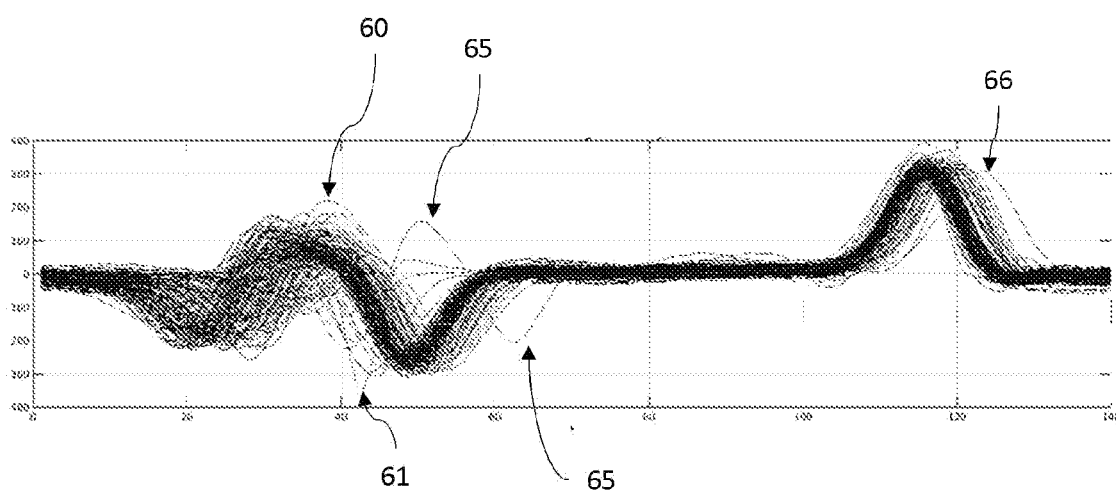
FIG. 6 shows an example of an extract of a second component of a measurement signal corresponding to the passing of a spacer plate by the measurement probe, without synchronisation.
Figure 7:
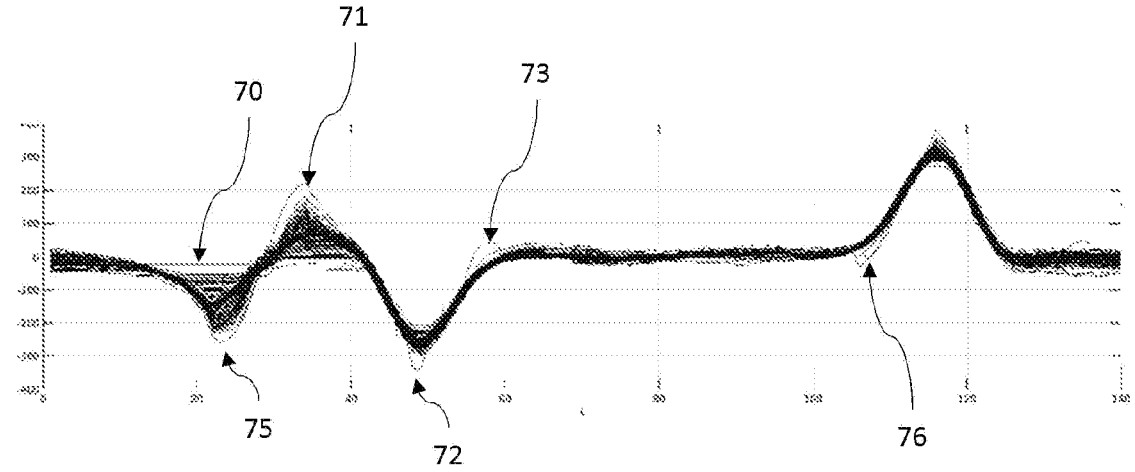
FIG. 7 shows the example of FIG. 6 after synchronisation by DTW with the reference time series.

FIG. 4 shows an example of an extract of a first component, and the occurrence YF2, of a measurement signal corresponding to the passing of a spacer plate 4 of the hot branch by the measurement probe 1, before synchronisation. FIG. 5 shows the example of FIG. 4 after synchronisation by DTW with the reference time series, which is the average of the measurement signals. FIG. 6 shows an example of an extract of a second component, and the occurrence XF3, of a measurement signal corresponding to the passing of a spacer plate 4 of the hot branch by the measurement probe 1, before synchronisation. FIG. 7 shows the example of the FIG. 6 after synchronisation by DTW with the reference time series, which is the average of the measurement signals. The units are arbitrary and have no significance, only counting the divisions with respect to the other measurement signals.

It is observed that the synchronisation makes it possible to bring together signals of similar shape, and certain signals detach from the set thus formed: the purpose of the next step in the process is precisely to detect the measurement signals which stand out. The following step is then a search (step S04) for a potential anomaly by measuring a potential local deviation of a measurement signal with respect to the other measurement signals. The search for a potential anomaly is preferably carried out component by component, and not on a vector in $\mathbb{R}^P$.

The search for a potential anomaly can, for example, be carried out via the local outlier factor (LOF). The LOF is based on the concept of local density, where the density is given by the k closest neighbours, the distance to which is used to estimate the density. By comparing the local density of a component of a measurement signal with the local densities of its neighbours, it is possible to identify the regions of similar density and the parts of a component of a measurement signal which have a density less than its neighbours, which are then considered as anomalies.

For its implementation, the LOF requires synchronous time series, like the measurement signals after DTW. Indeed, when a pattern in a time series does not occur at the same time as a similar pattern in several other time series, the local anomaly factor of the time series increases. The LOF is applied separately to each component, and is therefore not based on the Euclidean distance between the vectors in $\mathbb{R}^P$ grouping together the components of the measurement signal. In order that an anomaly is detected, it is sufficient that it is present on one of the components of the measurement signal.

The proposed approach makes it possible to highlight anomalies which would not have been detected or, conversely, to consider measurement signals having atypical values as free from anomalies. For example, with reference to FIG. 4, the method highlights the anomalies in the measurement signals corresponding to curves 40, 41, 42 or 43. By contrast, despite their apparent deviation before synchronisation, the measurement signals corresponding to curves 45 or 46 are not ultimately considered as presenting anomalies. The DTW can compensate potential time offsets between the measurement signals, which are not anomalies. Hence in FIG. 5, the measurement signal which would correspond to curve 45 of FIG. 4 is resynchronised with the others and no longer presents atypical behaviour. By contrast, the curves deviating from the majority behaviour 50, 51, 52, 53, 54 are still highlighted.

With reference to FIG. 6, the method highlights the anomalies in the measurement signals corresponding to curves 60 and 61. By contrast, despite their apparent deviation before synchronisation, the measurement signals corresponding to curves 65 or 66 are not ultimately considered as presenting anomalies. The DTW makes it possible, by recalculating the signals, to highlight atypical behaviours which do not appear as initially visible. Hence, in FIG. 7, the measurement signal corresponding to curve 70 has an anomaly that is not initially visible, whereas others remain highlighted, such as for example the measurement signals of curves 60 and 61, which now correspond to curves 71 and 72, and the deviation of which with respect to the majority behaviour remains visible. Other curves 75, 76, although sometimes having deviations, are not considered as anomalies by the method.

Other methods can be employed for searching for anomalies, all the more since the measurement signals are, after DTW, synchronised with one another, which makes possible the use of other methods requiring to be applied on the synchronise signals, such as kernel estimators or isolation forests.

The search for a potential anomaly, for example by the LOF, can be carried out on the entirety of a component of measurement signals. Preferably however, the search for a potential anomaly is section by section, in other words on temporal sub-parts of the component of the measurement signals. Hence, in the event of detection of an anomaly, a piece of location information of the defect in the tube 2 is directly accessible via the identification of the section in which the anomaly has been detected. It is even possible to apply the detection method (LOF or other) at each instant. The method is thus applied separately to each acquisition channel and to each instant, and therefore concerns scalars (elements of $\mathbb{R}$). A method such as LOF is based on the Euclidean distance, which is reduced here to the absolute value of the difference between values.

A median filter can preferably be applied to the result of the detection method such as LOF per instant, with a window size of the length of a typical defect (for example 2 mm), so as to regularise the identification of aberrant points. In this alternative, only the consecutive aberrant points—for which the median LOF exceeds a certain threshold—of size greater than the length of a typical defect are retained. Hence, the application instant by instant of the LOF makes it possible to both identify whether the signal is defective, but also to obtain the location and length of the defect in the signal.

The tubes 2 of a heat exchanger can have geometric particularities which can be exploited and, in particular in the case of a steam generator, the presence of a curved part 2b—the bend—framed by two straight parts 2a, 2c—the hot branch and the cold branch. However the size of the curved part 2b is not the same for all the tubes 2: the further the tube 2 is from the central axis of the steam generator, the more the length of the curved part 2b increases. At the same time, the tubes 2 no longer encounter the same number of anti-vibration bars 8. However, these variations in the profile of the tubes 2 are known a priori, and it is possible to group the tubes 2 having similar geometric characteristics in order to improve the detection of defects.

Hence, the method can comprise the selection, among the measurement signals, resulting from the passage of a measurement probe 1 in the tubes 2, belonging to a subset of tubes 2 grouped together according to the similarity of their physical properties. The remainder of the method is then applied to the measurement signals thus selected.

Once an anomaly is detected in a measurement signal, the corresponding tube 2 can be considered as having a defect. It is then possible to schedule a maintenance operation (step S05). It is, for example, possible to carry out an additional, more in-depth, inspection of this tube 2, or even to schedule and carry out a repair or replacement operation of this tube, if this operation is technically feasible. Defect detection can also validate the restart of the heat exchanger or, by contrast, lead to the permanent shutdown of the heat exchanger.

The invention is not limited to the embodiment described and shown in the attached figures. Modifications remain possible, in particular in terms of the constitution of the various technical features or by substitution of technical equivalents, without going beyond the scope of protection of the invention.

The invention claimed is:

1. A method for maintaining a tube heat exchanger, comprising:

obtaining measurement signals resulting from the passage of a multifrequency eddy-current measurement probe in the tubes of the heat exchanger, wherein each measurement signal is a multidimensional time series comprising P components, P being a natural integer greater than or equal to 2, determining by a processor of a computer a reference time series corresponding to an average, at each instant, of the measurement signals and comprising P components, synchronising each measurement signal with the reference time series by applying a dynamic time warping, DTW, to said measurement signal and the reference time series multidimensionally on the P components simultaneously, and searching for a potential anomaly by measuring a potential local deviation of a synchronised measurement signal with respect to the other measurement signals synchronised with the reference time series.

2. The method according to claim 1, wherein the search for a potential anomaly is carried out component by component by the processor of the computer.

3. The method according to claim 1, comprising a selection, among the measurement signals, of measurement signals resulting from the passage of a measurement probe in the tubes belonging to a subset of tubes grouped according to the similarity of their physical properties by the processor of the computer.

4. The method according to claim 1, wherein the search for a potential anomaly by measuring a potential local deviation of a measurement signal with respect to other measurement signals comprises determining by the processor of the computer a distance between a value of the measurement signal and the corresponding values of other measurement signals.

5. The method according to claim 4, wherein a median filter is applied by the processor of the computer to the distances determined during the search for anomalies.

6. A non-transitory computer-readable medium, comprising program code instructions for causing a computer to execute the steps of the method according to claim 1, when said program is executed by the computer.

* * * * *